USOO5747592A

United States Patent [19]
Huff et al.

[11] Patent Number: 5,747,592
[45] Date of Patent: May 5, 1998

[54] THERMOPLASTIC POLYMER COMPOSITIONS AND THEIR PRODUCTION AND USE

[75] Inventors: Terrence Huff, Baytown; James John McAlpin, Houston, both of Tex.

[73] Assignee: Exxon Chemical Patents, Inc., Houston, Tex.

[21] Appl. No.: 357,635

[22] Filed: Dec. 16, 1994

[51] Int. Cl.$^6$ .................................................. C08L 9/00
[52] U.S. Cl. ........................ 525/191; 525/192; 525/232
[58] Field of Search ............................. 525/191, 192, 525/232

[56] References Cited

U.S. PATENT DOCUMENTS

| | | | |
|---|---|---|---|
| 5,023,300 | 6/1991 | Huff et al. | 525/194 |
| 5,086,121 | 2/1992 | Hazelton et al. | 525/197 |
| 5,210,139 | 5/1993 | Huff et al. | 525/194 |

FOREIGN PATENT DOCUMENTS

| | | |
|---|---|---|
| 0228543 | 7/1987 | European Pat. Off. . |
| 228 543 A3 | 7/1987 | European Pat. Off. . |
| 465 317 A3 | 1/1992 | European Pat. Off. . |
| 519 725 A3 | 12/1992 | European Pat. Off. . |
| 531 045 A3 | 3/1993 | European Pat. Off. . |
| 605 180 A1 | 7/1994 | European Pat. Off. . |

OTHER PUBLICATIONS

"The Three Principal Development Axes of Polypropylene for Injection Moulding Applications" presented at the Polypropylene '93 Conference, Oct. 26–27, 1993, Zurich Switzerland.

"Impact Modifiers Get Tough With Cost–Performance", *Plastics World*, Mar. 1994, pp. 51–53.

*Primary Examiner*—Edward J. Cain
*Attorney, Agent, or Firm*—Darrell E. Warner

[57] ABSTRACT

A thermoplastic polymer composition incorporating at least about 50 wt % polypropylene, at least about 20 wt % of an elastomer such as EP rubber and at least about 4 wt % plastomer. The plastomer is preferably a single site catalyzed ethylene based copolymer having a density less than about 0.915. By adjusting the amount of the plastomer in the composition, considerable control is secured over post-mold shrinkage of components produced through injection molding operations utilizing the composition. The composition can be prepared as a reactor blend or a melt blend. The composition is particularly useful in producing large components such as bumpers and exterior trim fascia for automobiles.

32 Claims, No Drawings

THERMOPLASTIC POLYMER COMPOSITIONS AND THEIR PRODUCTION AND USE

FIELD OF THE INVENTION

This invention relates generally to thermoplastic polymer compositions and to their production and use. More particularly, this invention relates to thermoplastic olefin polymer compositions incorporating narrow composition distribution olefin based plastomers and to the manner of producing and using such compositions.

BACKGROUND OF THE INVENTION

Thermoplastic elastomers (TPEs) are an important class of polymers which are particularly useful in producing durable components through injection molding processes. A typical TPE structure is a matrix of a plastic component with discrete domains of an elastomeric component embedded therein. This structure yields a composite having a behavior similar to a cured elastomer but with the advantage that it undergoes plastic flow above the softening point of the plastic component. This permits TPEs to be used in components fabricated through thermoplastic injection molding. Such molding processes are generally impractical with conventional cured elastomers, because they do not undergo plastic flow at elevated temperatures.

Thermoplastic olefin elastomers (TPOs) are a class of TPEs based predominantly or wholly on olefin polymers. A typical TPO is a melt blend or reactor blend of a polyolefin plastic, typically polypropylene, with an olefin copolymer elastomer (OCE), typically an ethylene-propylene rubber. The polyolefin plastic imparts to the TPO the temperature resistance and rigidity typical of that resin while the elastomer provides flexibility, resilience and toughness.

TPOs are particularly well suited for producing flexible structures such as body parts for automotive applications. The principal automotive applications include bumper covers, exterior fascia, air dams and other trim, dashboard skins, and airbag covers. Various TPO formulations are available having physical properties highly desirable in such applications. The ability of TPOs to be injection molded makes them particularly attractive for the high volume production necessary in automotive applications.

One disadvantage of TPOs, and indeed of TPEs generally, is that in most injection molding processes they are subject to significant post molding shrinkage. For most TPO formulations the linear shrinkage in a typical injection molding operation is in the range of 1.0–2.0%. This generally does not cause any degradation in the properties of the completed product, but does mean that in applications where dimensional tolerances are important the mold must be tailored to the TPO formulation and the specific molding operation (e.g. the degree of cooling allowed prior to mold ejection) to yield a finished part of the precise dimension required. This shrinkage problem is particularly troublesome where the manufacturer has produced molds tailored to one TPO formulation and molding process and subsequently wishes to substitute a different TPO formulation or alter the process (e.g. increase the cooling rate). The substitution may result in a changed degree of shrinkage, yielding parts which are out of dimensional tolerance.

One solution to this problem is to employ additives in the TPO composition which assist in controlling shrinkage. Talc and other inorganic particulate materials are sometimes used for this purpose. Such shrinkage control additives carry with them disadvantages, though. They tend to reduce flexibility, decrease toughness, and degrade the surface finish of the completed part.

An alternative to shrinkage control agents is to alter the formulation of the TPO to increase the content of the elastomeric component relative to the plastic component. This entails several disadvantages: 1) it increases the cost of the TPO, since the elastomer is generally the most expensive component of the blend; 2) increasing the elastomer content degrades the melt flow behavior of the composition; and 3) as the elastomeric content is increased, it becomes increasingly difficult to disperse the elastomer within the plastic component.

It would be desirable to develop formulations for TPOs and other thermoplastic polyolefins to yield compositions which have reduced shrinkage but which do not introduce processing difficulties or materially degrade the physical properties of the finished part or increase its cost.

SUMMARY OF THE INVENTION

We have discovered that by incorporating plastomers into certain polyolefin compositions, blends are obtained which have reduced post mold shrinkage in injection molding applications. This ability to control shrinkage through the introduction of plastomers appears to be most pronounced for polypropylene based TPO's with relatively high flexural modulii. The preferred plastomers for this application are metallocene catalyzed ethylene based copolymers with densities in the range of 0.87–0.90.

An inorganic filler material can be added to provide additional shrinkage control and to counteract the decrease in flexural modulus typically resulting from the incorporation of the plastomer.

While the present invention appears to be most beneficial in shrinkage control of TPOs, it is also useful in controlling shrinkage of isotactic polypropylene homopolymers, random polypropylene copolymers, impact polypropylene copolymers and other thermoplastics used in injection molding and other applications in which shrinkage control is desirable.

DESCRIPTION OF THE PREFERRED EMBODIMENTS

Introduction

Our invention concerns improvements to thermoplastic olefin elastomer compositions ("TPOs"), impact copolymer compositions ("ICPs") and certain other thermoplastics. These improved TPOs and ICPs are particularly useful for injection molding applications in which it is desirable to achieve a specified low degree of post mold shrinkage. Following is a detailed description of certain preferred compositions within the scope of our invention, preferred methods for producing these compositions, and preferred applications of these compositions. Those skilled in the art will appreciate that numerous modifications to these preferred embodiments can be made without departing from the scope of the invention. For example, though the properties of the compositions are exemplified in injection molding applications, the compositions have other uses. Also, while the invention will be exemplified principally in connection with TPOs, it will be understood that the invention is also applicable to ICPs, polypropylene RCPs and other thermoplastics used in applications in which shrinkage is an issue. To the extent that our description is specific, this is done solely for the purpose of illustrating certain preferred embodiments of our invention and should not be taken as restricting our invention to these embodiments.

We have discovered that by incorporating relatively small amounts of plastomers (as defined below) into TPOs and certain other thermoplastic compositions, considerably improved compositions can be obtained. A principal advantage of these compositions is that a modest inclusion of plastomer yields a surprisingly great reduction in post mold shrinkage of parts produced through injection molding processes using the compositions. We have found that it is straightforward to relate the degree of shrinkage to the amount of plastomer utilized in the composition, for a given base resin and given molding operation. This allows a resin supplier to provide compositions tailored to have whatever reasonable degree of post-mold shrinkage is desired by the customer. Metallocene catalyzed polyethylene copolymers with densities in the range of 0.87–0.90 g/cm$^3$ are the preferred plastomers for use in this invention. Shrinkage control is not the sole benefit of the invention. The incorporation of plastomer also enhances low temperature impact strength and provides other advantages.

Another key aspect of our invention is that plastomers can be used in conjunction with conventional shrinkage control agents such as talc. The resulting compositions derive much of the cost savings provided by the inexpensive filler while avoiding to a significant degree the degradation in physical properties which typically occurs when such fillers are used in greater amounts.

Composition and Production of the Base TPOs

For the purpose of this description and the appended claims, the term "thermoplastic olefin polymer" ("TPO") shall mean those blends of polypropylene and rubber which are substantially thermoplastic and have a flexural modulus in the range of 40,000–180,000 psi (276–1240 NPa). Most typically, TPOs have a polypropylene content in the range of 50–80 wt % and a rubber content in the range of 15–50 wt %. The polypropylene may be homopolypropylene, propylene based copolymers or combinations of the two. The term "polypropylene", as used in this description and the appended claims, is defined to mean any propylene based polymer having a propylene content of at least 80 wt %. In most applications it will be desirable that the polypropylene phase be continuous or nearly continuous. The rubber phase exists in discrete domains dispersed throughout the polypropylene phase. Most commonly, the rubber will be an ethylene-propylene rubber or an ethylene-propylene terpolymer rubber, however, other rubber compositions may be used. The term "elastomer", as used in this description and the appended claims shall mean any essentially non-crystalline polymeric component having a low glass transition temperature (typically $\leq -35°$ C.). The base TPO may also include additional olefin polymers, fillers, pigments, stabilizers and property modifiers. Further details regarding the composition and properties of TPOs are set forth in U.S. Pat. Nos. 3,806,588, 4,143,099, 5,023,300 and 5,210,139, all of which are incorporated herein by reference for the purposes of U.S. patent practice.

The manner in which the base TPOs are produced is not critical to the present invention. They can be produced by conventional melt blending of the individual components, by "reactor blending", by combinations of these two processes, or other means which achieves a dispersion of discrete elastomer regions within a substantially continuous polypropylene matrix.

In the preferred method of producing base TPOs, a random propylene-ethylene copolymer is produced in an initial bulk liquid polymerization step conducted in a reactor. In some processes, multiple reactors and may be employed for this step. The copolymer is preferably about 3 wt. % ethylene and has a very high molecular weight, preferably above 500,000 $M_v$ (viscosity average molecular weight). The product of the bulk liquid polymerization step is then fed to a gas phase reactor in which a 60 wt. % EP ethylene elastomer is produced. The process is controlled such that the EP elastomer addition to the propylene-ethylene copolymer is in the range of 18–28 wt. %, preferably about 20–26 wt. %, based on the combined weight of the elastomer and the copolymers. To this granular reactor product, a stabilizer and a peroxide are added to allow visbreaking in a following extrusion step conducted in an extruder. The amount of peroxide and the extruder operating conditions are controlled such that the extruded reactor TPO has the desired melt flow rate. By maintaining a very high molecular weight in producing the polymerization steps and then visbreaking the copolymer in the extrusion step to yield a lower molecular weight product, a reactor TPO of the desired melt flow rate can be efficiently produced while avoiding potential fouling in the liquid polymerization step. The desired quantity of plastomer (as described more fully below) may be added at the feed point of the extruder. Further details of producing the reactor TPO are taught in U.S. Pat. Nos. 5,023,300 and 5,210,139, referenced above.

The Plastomers and their Incorporation into the TPO

In a preferred embodiment, the TPO of the present invention includes in the range of about 2–40 wt % plastomer, more preferably 3–20 wt %, yet more preferably 4–15 wt % and most preferably 5–12 wt %. For the purposes of this application, the term "plastomer" shall mean ethylene based copolymers having a density in the range of about 0.86–0.915 gm/cm$^3$. In many embodiments it will be desirable to use the lowest density plastomer consistent with maintaining good handling of the plastomer resin. In warm climates, it will often be desirable to use densities above about 0.890, to avoid the need for chilled resin storage, due to cold flow of lower density resins having the desired melt index. The preferred melt index range of the plastomer is in the range of about 0.5–40 g/10 min, with 1.0–10 g/10 min being most preferred. In some applications it will be desirable to select a plastomer having a melt index near that of the base TPO blend.

The preferred plastomers for use in the present invention are those produced utilizing metallocene catalysts. Most preferred are those ethylene based copolymer plastomers sold under the trademark Exact™, available from Exxon Chemical Company of Houston, Tex. These plastomer have a plastic-like molecular weight for better dispersion in polypropylene. They are also free of exterior dusting agents and interior processing aids which could adversely affect the properties of the TPO. The invention can also be practiced using Engage™ polymers, a line of metallocene catalyzed plastomers available from Dow Chemical Co. of Midland, Mich. Metallocene catalyzed plastomers are characterized by narrow molecular weight distribution (typically in the range of 1.8 to 3.5), low ash content and narrow composition distribution.

The composition distribution is a measure of the variance in comonomer content among the polymer molecules. One measure of the composition distribution is the composition distribution breadth index, or "CDBI", which is a measure of what fraction of the molecules have a comonomer content within±25% of the mean comonomer content. The CDBI can be measured utilizing temperature rising elution fractionation techniques. Further details of CDBI and one method for measuring it are given in U.S. patent application Ser. No. 061,929, having a priority date of May 13, 1993.

The preferred plastomers for use in the present invention have a CDBI of at least 45%, preferably at least 50% more preferably at least 60% and most preferably above 70%. They have a MWD of below 4.0, preferably in the range of 1.7–3.5, more preferably in the range of 1.8–3.0 and most preferably in the range of 1.9–2.8. They have a density in the range of 0.865–0.92 g/cm$^3$; preferably in the range of 0.87–0.91 g/cm$^3$, more preferably in the range of 0.88–0.905 g/cm$^3$, and most preferably in the range of 0.880–0.900 g/cm$^3$. The preferred comonomers are non-cyclic mono-olefins such as butene-1, pentene-1, hexene-1, octene-1 and 4 methyl-pentene-1. However, cyclic mono-olefins and both linear and cyclic dienes can also be used. It will be desirable in some applications to use ethylene, alpha-olefin, diene terpolymers. This is advantageous in that it provides the plastomer with residual unsaturation to allow a functionalization reaction or cross-linking in the rubber phase of the finished product.

The manner in which the plastomer is incorporated into the TPO is not critical, provided it is well dispersed throughout at least the rubber component of the TPO. For reactor TPOs, the plastomer can be incorporated by addition of plastomer pellets immediately upstream of the pelletizing extruder. Alternatively, it can be added by the TPO producer or by a compounder in a compounding step after production of the TPO, or by the converter in a blending process prior to fabricating the end product. For compounded TPOs, the plastomer can be added at the time of melt blending. Alternatively, the plastomer can be pre-blended with the rubber component, with the rubber-plastomer blend later being compounded with the polypropylene in producing compounded TPOs.

Properties and Applications of the Present TPO Compositions

The addition of plastomer to TPO compositions imparts numerous property advantages. As discussed in greater detail below, one of the key advantages is reduced post mold shrinkage. Other advantages include an increase in the low temperature impact strength, improved surface gloss and appearance, improved resiliency and some reduction in opacity. The plastomer also works a significant decrease in the flexural modulus of the TPO, which will be advantageous in many applications. In some applications, the addition of plastomer will also enhance the processability of the finished composition. Naturally, certain debits are also associated with the inclusion of a plastomeric component. Both surface hardness (i.e. Shore D) and tensile strength at yield will decrease as plastomer content increases. Such debits can often be accommodated by selecting a base TPO with a higher surface hardness and tensile strength at yield than the desired ultimate values.

Table I provides data illustrating the shrinkage reduction imparted by the inclusion of plastomer into two commercially available reactor TPOs. The blending was accomplished by adding the plastomer in an extrusion step to the reactor TPO production process product. In a commercial operation, this plastomer addition would preferably be made to the post reactor extruder in the reactor TPO production process. Note that a modest addition of plastomer yielded a surprisingly great degree of shrinkage control for the stiff TPO (PD 8154). The effect was not as pronounced in the soft TPO (PD8191). Tables 2–4 identify the resins employed in the tests. Table 5 recites the test methods employed.

By adjusting the amount of plastomer in the blend, any degree of shrinkage control, in many instances down to at least about 0.35%, can be secured. This is particularly useful in developing substitute TPOs for an existing application. As discussed above, molds used in injection molding parts are adapted to a specific TPO grade and process so that the finished part is exactly the desired size. This has had the effect of locking an injection molder into a specific TPO grade due to the difficulty and expense in identifying another TPO grade with the same shrinkage characteristics for that process. The present invention allows the post mold shrinkage to be readily adjusted without, in most instances, any major adverse impact on other properties.

TPOs Incorporating both Plastomers and Other Shrinkage Control Additives

In some applications it will be particularly advantageous to utilize both plastomer and an inorganic filler or other shrinkage control additive in a TPO composition. It is well known to employ such inorganic additives as talc, calcium carbonate, mica, certain clays and glass fibers for the purpose of achieving shrinkage control. Many other compounds known to those skilled in the art can be used for this purpose. The key properties of such shrinkage control agents is that they are inexpensive compared to the polymeric components of the TPO, they are substantially inert in the application, and they control shrinkage. The disadvantage of using such materials is that they generally have a net adverse impact on the physical properties of the TPO. For example, they typically degrade surface smoothness of molded parts, they raise the brittle temperature, they increase the modulus of elasticity (sometimes this is not a disadvantage), they degrade the ability to injection mold the TPO and they generally increase the density of the TPO material.

Many of the disadvantages of these fillers can be overcome by using them in conjunction with plastomers. The plastomer tends to improve most of the properties degraded by the filler. Where the filler degrades surface appearance, the plastomer improves it. Where the filler raises the brittle temperature, the plastomer depresses it. Where the filler increases the modulus of elasticity, the plastomer decreases it. Likewise, the filler can improve certain potential disadvantages introduced by the plastomer. For example, where the plastomer decreases surface hardness, the filler increases it. Thus, by careful selection of the relative amounts of plastomer and filler used in a TPO composition, it is possible to obtain a TPO that is less expensive than the base TPO, has greatly reduced post-mold shrinkage than the base TPO, yet has substantially the same brittle temperature, modulus of elasticity and surface hardness as the base TPO. Those skilled in the art will appreciate that by varying the relative fractions of the plastomer and filler in the TPO a wide range of property mixes can be achieved.

Table 6 illustrates the shrinkage reduction available by blending both talc and various plastomers with Escorene PD 7565, an ICP available from Exxon Chemical Company of Houston, Tex. This is also illustrated in Composition G in Table 1.

Those skilled in the art will appreciate that the compositions of the present invention have formulations, production methods, applications and advantages beyond those expressly recited herein. For example, as previously recited, though the present invention has been exemplified principally in connection with TPO compositions, it is also applicable to ICPs, polypropylene RCPs and other thermoplastic olefin resins in which it is desirable to control shrinkage. The coverage of this patent is limited only as set forth in the appended claims.

TABLE 1

Plastomer Modification of Polypropylene Copolymer

| Composition, wt % | A | B | C | D | E | F | G | H | I | J |
|---|---|---|---|---|---|---|---|---|---|---|
| Escorene PD 8154 | 100 | 95 | 92.5 | 90 | 87.5 | 85 | 81.4 | | | |
| Escorene PD 8191 | | | | | | | | 100 | 70 | 60 |
| EXACT 3035 | | 5 | 7.5 | 10 | 12.5 | 15 | 9.4 | | 30 | 40 |
| Talc (Microtuff 1000) | 0 | 0 | 0 | 0 | 0 | 0 | 9.2 | 0 | 0 | 0 |
| Properties | | | | | | | | | | |
| Yield Strenght, PSI* | 3024 | 3007 | 2938 | 2860 | 2699 | 2780 | 3024 | | | |
| Flex Modulus, Tan., Kpsi | 140 | 136 | 132 | 112 | 104 | 109 | 143 | 70.4 | 45.7 | 36.6 |
| Brittle Temp., °C. | −39 | −43 | −45 | −51 | −50 | −46 | −31 | | | |
| Vicat Soft. Temp., °C. | 134 | 127 | 129 | 120 | 109 | 113 | 121 | | | |
| Shrinkage, MD% | 1.23 | 1.06 | 1.05 | 0.9 | 0.66 | 0.59 | .64 | 1.2 | 0.91 | 0.88 |
| Shore D (10 sec. delay) | 58 | — | — | 55 | 54 | 55 | 58 | | | |
| Specific Gravity | 0.90 | 0.89 | 0.89 | 0.89 | 0.90 | 0.90 | 0.96 | | | |
| Tensile Strength @ Break, Kpis | | | | | | | | 2.4 | 1.9 | 1.8 |

*Cross-head speed for test at 20 inches/min.

TABLE 2

Polypropylene Copolymer

| Grade | Melt Flow Rate | Ethylene Content, wt. % | Supplier |
|---|---|---|---|
| Escorene PD 8154 | 11 | 15 | Exxon Chemical |
| Escorene PD 8191 | 1 | 17.5 | Exxon Chemical |
| Escorene PD 7565 | 45 | 8.2 | Exxon Chemical |

TABLE 3

Metallocene Plastomers

| Grade | Melt Index | Density | Comonomer | Supplier |
|---|---|---|---|---|
| EXACT ™ 3035 | 3.5 | 0.9 | Butene | Exxon Chemical |
| EXACT ™ 4033 | 0.8 | 0.88 | Butene | Exxon Chemical |
| EXACT ™ 4041 | 3 | 0.878 | Butene | Exxon Chemical |
| ENGAGE ™ 8100 | 1 | 0.87 | Octene | Dow Chemical |
| ENGAGE ™ 8150 | 0.5 | 0.87 | Octene | Dow Chemical |
| ENGAGE ™ 8200 | 5 | 0.87 | Octene | Dow Chemical |

TABLE 4

Ethylene Propylene Rubber

| Grade | Melt Index | Density | Comonomer | Supplier |
|---|---|---|---|---|
| JSR-07P | 0.3 | 0.864 | Propylene | Japan Synthetic Rubber |
| JSP-02P | 1.7 | 0.864 | Propylene | Japan Synthetic Rubber |

TABLE 5

Test Method

| Test | Test Method |
|---|---|
| Flexural Modulus-1% Secant | ASTM D-790 |
| Shrinkage | ASTM D-955 |
| Melt Flow Rate | ASTM D-1238 (L) |
| Melt Index | ASTM D-1238 (E) |
| Tensile Strength | ASTM D-638 |
| Notched Izod @ 23° C. | ASTM D-256 |
| Density | ASTM D-1505 |

TABLE 6

Plastomer Modification of Talc Filled Polypropylene Copolymer

| Composition | K | L | M | N | O | P | Q | R | S |
|---|---|---|---|---|---|---|---|---|---|
| Escorene PD 7565 | 100 | 60 | 60 | 60 | 60 | 60 | 60 | 60 | 60 |
| JSR-07P | | 30 | | | | | | | |
| JSR-02P | | | 30 | | | | | | |
| EXACT 3035 | | | | 30 | | | | | |
| EXACT 4033 | | | | | 30 | | | | |
| EXACT 4041 | | | | | | 30 | | | |
| ENGAGE 8100 | | | | | | | 30 | | |
| ENGAGE 8150 | | | | | | | | 30 | |
| ENGAGE 8200 | | | | | | | | | 30 |
| CIMPACT 710 (talc) | | 10 | 10 | 10 | 10 | 10 | 10 | 10 | 10 |
| Property | | | | | | | | | |
| Shrinkage | 1.4 | 0.46 | 0.43 | 0.47 | 0.41 | 0.35 | 0.38 | 0.45 | 0.35 |
| 1% Secant Modulus, Kpsi | 170 | 124 | 120 | 143 | 131 | 126 | 117 | 118 | 121 |

TABLE 6-continued

Plastomer Modification of Talc Filled Polypropylene Copolymer

| Composition | K | L | M | N | O | P | Q | R | S |
|---|---|---|---|---|---|---|---|---|---|
| Notched Izod @ 23° C., Ft-lbs/in | | 11 | 8.7 | 5.9 | 11.6 | 8.9 | 12 | 12.6 | 10.3 |
| Tensile Strength @ Break, Kpsi | | 2.1 | 2.1 | 2.8 | 2.5 | 2.5 | 2.2 | 2.2 | 2.4 |

We claim:

1. A thermoplastic polymer composition, comprising:
   polypropylene in an amount of at least 50 wt % of the polymer component of said composition;
   rubber in an amount of at least 20 wt % of the polymer component of said composition;
   plastomer produced through metallocene catalysis in an amount of at least 4 wt % of the polymer component of said composition, said plastomer having a melt index in the range of 0.5 to 50 g/10 min, a density in the range of 0.86–0.92, and a MWD<3.5; and
   optionally, a non polymeric component.

2. The composition as set forth in claim 1 wherein said non polymeric component is less than 15 wt % of the total composition.

3. The composition as set forth in claim 1 wherein said polypropylene is a propylene based copolymer.

4. The composition as set forth in claim 3 wherein said polypropylene is a random copolymer of propylene and ethylene.

5. The composition as set forth in claim 1 wherein said polypropylene and rubber are produced in a continuous reactor TPO process.

6. The composition as set forth in claim 1 wherein said plastomer constitutes in the range of 4–15 wt. % of said polymeric component of said composition and wherein an increase in the amount of said plastomer causes a reduction in post mold shrinkage in an injection molding application.

7. The composition as set forth in claim 6 wherein said plastomer constitutes in the range of 4–12 wt % of said polymeric component, and wherein said plastomer is a copolymer of ethylene and at least one C4–C20 alpha-olefin.

8. The composition as set forth in claim 7 wherein said composition incorporates at least 10% by weight of an inorganic filler.

9. A polymer composition, comprising:
   polypropylene in an amount of at least 50 wt % of the polymer component of said composition;
   elastomer in an amount of at least 15 wt. % of the polymer component of said composition;
   plastomer, formed using metallocene catalyst, in an amount in the range of between 2 wt. % and 15 wt % of the polymer component of said composition; and at least one non-polymeric filler in an amount sufficient to reduce the post mold shrinkage of said composition in an injection molding application by at least 10% relative to shrinkage in the absence of said filler.

10. The polymer composition as set forth in claim 9 wherein said plastomer is a metallocene catalyzed ethylene based copolymer and wherein an increase in the amount of plastomer causes a reduction in the amount of shrinkage.

11. The polymer composition as set forth in claim 10 wherein said plastomer is added in an amount sufficient to reduce the shrinkage of said composition in an injection molding application by at least 10% relative to shrinkage in the absence of said plastomer.

12. The polymer composition as set forth in claim 11 wherein filler and said plastomer are collectively added in an amount sufficient to reduce shrinkage by at least 30% relative to shrinkage in the absence of said filler and plastomer components.

13. The polymer composition as set forth in claim 12 wherein said shrinkage reduction is at least 40%.

14. The polymer composition as set forth in claim 12 wherein said flexural modulus is within 20% of the flex modulus in the absence of said filler and plastomer components.

15. The polymer composition as set forth in claim 13 wherein said flexural modulus is within 20% of the flex modulus in the absence of said filler and plastomer components.

16. The polymer composition as set forth in claim 9 wherein said propylene and elastomer are in the form of a TPO.

17. The polymer composition as set forth in claim 9 wherein said propylene and elastomer are in the form of an ICP.

18. A method for producing molded parts utilizing an existing mold, said parts having a selected degree of shrinkage relative to said mold, said method comprising:
   a) determining the degree of shrinkage desired for a selected set of molding conditions;
   b) selecting a thermoplastic olefin composition having a degree of shrinkage at least 10% greater than the desired degree of shrinkage;
   c) adding an amount of a metallocene catalyzed plastomer to said composition to yield a blend having the selected degree of shrinkage.

19. The method as set forth in claim 18 wherein said method further includes adding an amount of an inorganic filler material, the amounts of said inorganic filler material and said plastomer being selected such that the blend has the selected degree of shrinkage and the modulus of elasticity of the completed part is within 10% of that of the thermoplastic olefin composition absent said filler and plastomer.

20. The method as set forth in 19 wherein the degree of shrinkage of the thermoplastic olefin composition is at least 20% greater than the desired degree of shrinkage.

21. A method for producing a molded part for a vehicle, said part having one dimension of at least 1 meter, said method comprising the steps of:
   a) determining the degree of shrinkage desired for a selected set of molding conditions;
   b) selecting a thermoplastic olefin composition having a degree of shrinkage at least 10% greater than the desired degree of shrinkage;
   c) adding an amount of a metallocene catalyzed plastomer to said composition to yield a blend having the selected degree of shrinkage; and
   d) molding said part using said selected set of molding conditions.

22. The method as set forth in claim 21 further comprising the addition of a non-polymeric filler, said plastomer and filler being added in sufficient quantities that the blend has the selected degree of shrinkage.

23. The method as set forth in claim 21 wherein said part is a bumper.

24. The method as set forth in claim 21 wherein said thermoplastic olefin composition is a TPO.

25. The method as set forth in claim 21 wherein said thermoplastic olefin composition is an ICP.

26. The method of claim 18 wherein said molded parts are produced by injection molding.

27. The composition as set forth in claim 1 wherein said plastomer has a CDBI of at least about 45%.

28. The composition as set forth in claim 9 wherein said plastomer has a CDBI of at least about 45%.

29. A thermoplastic polymer composition comprising a polymer component and, optionally, a non polymeric component, said polymer component consisting essentially of:

polypropylene in an amount of at least 50 wt % of the polymer component of said composition;

rubber in an amount of at least 20 wt % of the polymer component of said composition; and plastomer, produced using metallocene catalyst, in an amount of at least 4 wt % of the polymer component of said composition, said plastomer having a melt index in the range of 0.5 to 50 g/10 min, a density of less than about 0.90 g/cm$^3$, and a MWD of less than about 3.5.

30. The composition as set forth in claim 29 wherein said plastomer has a CDBI of at least about 45%.

31. The composition as set forth in claim 29 wherein the incorporation of said plastomer into said composition reduces post mold shrinkage in injection molding applications relative to shrinkage in the absence of said plastomer.

32. The composition as set forth in claim 31 wherein the degree of post mold shrinkage is related to the amount of plastomer incorporated.

* * * * *